United States Patent [19]

Brandstetter

[11] Patent Number: 5,185,815
[45] Date of Patent: Feb. 9, 1993

[54] MULTIPLE TARGET CORRELATOR SYSTEM

[75] Inventor: Robert W. Brandstetter, Levittown, N.Y.

[73] Assignee: Grumman Aerospace Corporation, Bethpage, N.Y.

[21] Appl. No.: 787,813

[22] Filed: Nov. 4, 1991

[51] Int. Cl.$^5$ .............................................. G06K 9/76
[52] U.S. Cl. ...................................... 382/31; 382/42; 359/29; 359/559; 359/561
[58] Field of Search ....................... 382/31, 42, 43, 54; 250/396 R; 364/822; 359/20, 29, 559, 560, 561

[56] References Cited

U.S. PATENT DOCUMENTS

| | | | |
|---|---|---|---|
| 4,892,408 | 1/1990 | Pernick et al. | 382/31 |
| 4,949,389 | 8/1990 | Allebach et al. | 382/31 |
| 4,958,376 | 9/1990 | Leib | 359/561 |
| 4,972,498 | 11/1990 | Leib | 359/29 |
| 4,980,922 | 12/1990 | Leib | 359/561 |
| 5,020,111 | 5/1991 | Weber | 359/559 |
| 5,107,351 | 4/1992 | Leib et al. | 382/42 |

Primary Examiner—Jose Couso
Attorney, Agent, or Firm—Scully, Scott, Murphy & Presser

[57] ABSTRACT

A multiple target correlation system for unambiguously detecting, locating and determining the orientation of an array of multiple targets or objects. The multiple target correlator provides a means for fabricating a matched filter array or multiple matched filter with multiple targets stored on a single plate and a method for interrogating this multiple target matched filter with multiple scene images thereby providing for the identification of each object or target and determining its location and orientation in coordinates that are user selectable. The multiple target correlator utilizes a multiple matched filter having two matched filters for each particular object or target stored thereon, and each matched filter is positioned at a unique angle. Since there are two matched filters for each object or target, there will be correlation at two different angles, one for each filter, and since the angular difference is unique for that object, then the difference between the matched filter angles will serve as an identification tag for that object. In addition, the angles at which the consecutive correlations occur are noted and utilized to determine the location and orientation of each of the objects.

32 Claims, 8 Drawing Sheets

MULTIPLE TARGET CORRELATOR SYSTEM

BACKGROUND OF THE INVENTION

1. Field of the Invention

The present invention relates to optical processors, and more particularly, to optical target recognizer systems incorporating a multiple target correlator. The multiple target correlator utilizes multiple matched filters, two for each individual target or object, recorded at a predetermined unique angular difference on a single plate and provides a method for interrogating these multiple target matched filters with a particular scene of interest.

2. Discussion of the Prior Art

In today's "high-tech" manufacturing environment, fabrication trends have been toward closer tolerances and higher complexity, thereby leading to highly labor intensive manufacturing processes. The introduction of automated assembly systems, such as robots, into the factory has been slow in coming due to today's lower production rates. A cost effective approach or solution to this problem is the use of flexible manufacturing systems, utilizing robotics, which are capable of working on a variety of assemblies having similar construction. One of the major limitations associated with the use of robotic systems is the identification of the various components used to manufacture a given product. Early robotic vision systems incorporated a main frame computer which would decompose a particular image of each viewed part into a series of lines and arcs which were used to locate and identify the selected part.

To meet the increasing demand placed upon robotic systems, robotic vision subsystems with increased memory and performance were designed. These vision subsystems were designed to be smaller in size and lower in cost while providing higher acquisition and processing rates for higher rates of production. In order to provide this, the vision subsystems incorporated optical target recognizer systems employing optical correlation techniques.

Present optical target recognizer systems can detect, locate and track a specific target for various target orientations. The optical target recognizer system can be designed to accept a real time image of a scene in which a target of interest may or may not be present. The input image is converted into an electrical signal which in turn is input to a spatial light modulator. The spatial light modulator serves to store an image of the real time input and acts like an optical transparency impressing the image onto a laser beam in the form of amplitude and/or phase modulation. The image modulated laser beam is then Fourier transformed and directed to an optical matched filter. The matched filter contains previously recorded Fourier transform holograms of targets of interest. The output of the matched filter is Fourier transformed again to achieve an inverse Fourier transform. The result of this inverse Fourier transforming step results in an autocorrelation signal if there is a match between the input image and the recording on the matched filter, and a cross-correlation signal if there is no match. While this operation for a specific target functions extremely well, it does not provide a means for unambiguously detecting, identifying, locating and determining the orientation of each target in a scene including multiple targets.

Manufacturing processes that require multiple parts require robotic systems that can not only detect the various parts, but also differentiate between the various parts. The basic problem is, given a multiple of input objects and a corresponding multiple of matched filters, how is one to determine which correlation spot (auto-correlation) belongs to which object and how is the orientation of each object to be determined. With the present state of the art, to acquire multiple objects, a series of matched filters and a transport mechanism are needed to eliminate the ambiguity. Alternative methods considered involve the use of multiple recording techniques with holographic or optical tags to differentiate between objects and determine their orientation. As of the present date, there has been little success on how these prior art approaches might be effectively implemented.

SUMMARY OF THE INVENTION

The present invention is directed to a multiple target correlator system comprising an imaging means for providing an image of an object or scene of interest. A coherent and collimated beam of light is modulated with the image of the object or scene of interest thereby resulting in an image modulated beam. The image modulated beam is optically Fourier transformed into a spatial frequency distribution of the image by an optical Fourier transform means. A multiple matched filter comprises at least one matched filter element having at least two matched filters recorded thereon, and wherein the at least two matched filters are recorded at a predetermined unique angular difference. The multiple matched filter is disposed in the back focal plane of the optical Fourier transform means such that the spatial frequency distribution of the image multiplically interacts with the at least two matched filters resulting in first and second product signals. The signals exiting the multiple matched filter are directed to a means for optically inverse Fourier transforming the first and second product signals to produce a pair of optical correlation signals. A correlation plane detector means, disposed in the back focal plane of the means for optically inverse Fourier transforming, detects the pair of optical correlation signals exiting the means for optically inverse Fourier transforming and produces electric output signals representative of the pair of correlation signals. The electric output signals are input into a means for processing. The means for processing comprises storage means having the predetermined unique angular difference of said at least two matched filters stored therein. The means for processing further comprises means for receiving the electric output signals from the correlation plane detector means, and a means for calculating the orientation of the particular object of interest and providing the particular object of interest with an identification tag. A resolving means is also utilized for calculating the position of the particular object of interest in user defined coordinates. The resolving means having means for receiving the position of the particular object of interest, in camera coordinates, from the correlation plane detector and the angular difference between the particular object and the coordinate axis of the particular scene of the particular object of interest from the storage means.

The multiple target correlator system of the present invention overcomes the limitations of prior art optical target recognizer systems by recording and storing multiple targets at different angles on a matched filter plate. False target detection is eliminated by setting the angular difference between each object matched filter such that it is different from all other object matched filter angles and multiples thereof. To eliminate ambiguity each object is recorded at two angular positions and the difference angle for that object is unique. In this manner it is possible to detect, locate and determine the orientation of multiple objects in a scene with a single matched filter plate. By extending this concept to an R×C (row x column) array of matched filter elements, the number of different objects stored can be increased and/or range scale stored by allocating different elements of the R×C array.

To provide angular scanning for interrogation of the matched filter or R×C multiple matched filter, the input image scene is rotated in the plane of the camera at some rate $\theta_s$ or in the alternative, the scene is stationary and the camera plane is rotated at the particular rate $\theta_s$. Since there are two matched filters for each object, there will be two correlations at two different angles, one for each filter, and since the angular difference is unique for that object their $\Delta\theta$ will then serve as an identification tag for that particular object. The angles at which the consecutive correlations occur are noted and utilized to determine the location and orientation of each of the objects.

The multiple target correlation system of the present invention provides a means for fabricating a matched filter with multiple targets or objects stored on a single matched filter plate, a method for interrogating this multiple target matched filter with multiple scene images, and a method for unambiguously identifying each image or target and determining its location and orientation in coordinates that are user selectable. Present correlators provide this information only for one object at a time. Since this invention makes it possible to store a number of different targets or objects on a single matched filter plate and interrogate it with a multiple image scene to detect, identify, locate and establish the orientation of each scene object that is contained in the matched filter element, it has various applications in the field of robotics, autonomous guidance systems, air and space vehicles and missiles.

DESCRIPTION OF THE PREFERRED EMBODIMENT

The present invention provides a system and method for unambiguously detecting, locating and determining the orientation of each target in a scene having multiple targets or objects. The problems previously associated with this procedure are, given a multiple of input objects and a corresponding multiple of matched filters, how does one determine which correlation spot belongs to which object. The multiple target correlator system of the present invention utilizes a matched filter array or multiple matched filter with multiple targets stored or recorded on a single plate and a method for interrogating this multiple target matched filter with multiple scene images thereby providing the identification of each object or target and determining its location and orientation in coordinates that are user selectable.

In the multiple target correlator system, a particular object or target, which is to be located, has two corresponding matched filters on a single matched filter plate, commonly referred to as a multiple matched filter, MMF. The number of matched filters recorded on a particular MMF array varies with the actual physical size of the particular multiple matched filter array. The size of a particular multiple matched filter array is limited by factors such as the efficiency of the lens used to record the filters, available laser power, and as will be discussed subsequently, the number of angles available for recording of the matched filters. In a preferred embodiment, a 3×3 MMF array is utilized, and eight matched filters will be recorded at eight unique orientations for each of the nine elements of the 3×3 MMF array, yielding a total of seventy-two matched filters. Since the present invention requires at least two matched filters for each object, thirty-six objects can be recorded on a particular multiple matched filter array.

Figure 1:
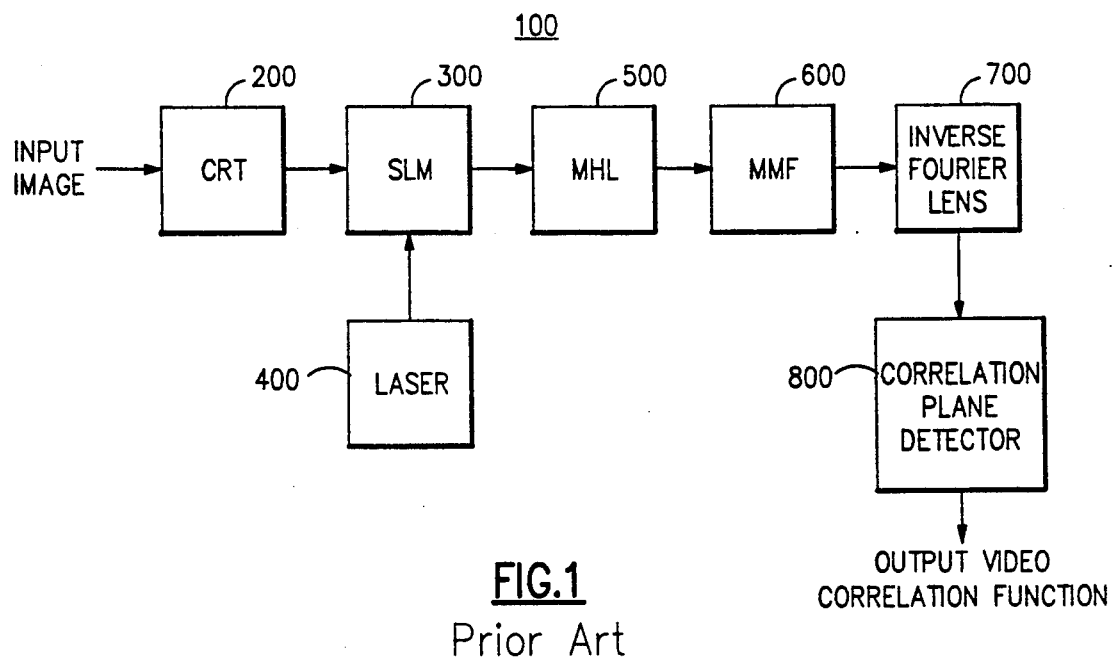
FIG. 1 is a block diagram of an optical target recognizer system.

Before the invention is described in detail however, it is beneficial to understand the basic elements which comprise current state of the art optical target recognizer systems, and the overall operation of a general optical target recognizer system. A basic working knowledge of optical target recognizers is necessary in order to understand the present invention because the optical target recognizer is a fundamental building block of the multiple target correlator system of the present invention. FIG. 1 is a general block diagram illustrating the components or elements of an optical target recognizer system 100. The optical target recognizer 100 can detect, locate and track a specific target; however, it cannot unambiguously detect, identify, locate and determine the orientation of each of a plurality multiple targets without the use of the multiple target correlator system.

The optical target recognizer 100 is designed to accept a real time image of a scene in which a target of interest may or may not be present. The input image is transferred to a cathode ray tube 200 for display and imaged upon a spatial light modulator 300. The spatial light modulator 300 serves to store an image of the real time input scene and acts like an optical transparency impressing the image onto a collimated coherent laser beam, supplied by a laser 400, in the form of amplitude and/or phase modulation. The operation in effect produces a noncoherent-to-coherent conversion of the image. The image modulated laser beam is then Fourier transformed and replicated a multiple of times by a multiple holographic lens 500 and directed to a previously stored Fourier transform hologram, which is the multiple matched filter 600 previously discussed. In taking the Fourier transform of the modulated laser beam, a spatial frequency distribution of the image is achieved. The spatial frequency distribution of the image is utilized to address or interrogate the multiple matched filter 600 to ultimately determine if there is a match between the captured image and the Fourier transforms of the objects previously recorded on the multiple matched filter 600. The optical addressing of the multiple matched filter 600 produces optical multiplications in the Fourier spatial frequency plane. The output of the multiple matched filter 600, which is the product of the spatial distribution of the image and the object recorded on the multiple matched filter 600, is then directed to a second Fourier transform lens 700 to transform the product back into the space domain. The transformation from the spatial frequency domain into the space domain results in two distinct signals. The transformation from the spatial frequency domain into the space domain in optical systems is analagous to the transformation from the frequency domain into the time domain in electrical engineering applications. One signal represents the convolution of the input image and the previously recorded image in the matched filter memory, and the second signal is the correlation signal. Although the properties of the convolution signal are important, the signal which is of importance in the present invention is the correlation signal. The correlation signal consists of an autocorrelation point where the target or object, if present, appears and various cross correlations for other objects in the scene. The cross-correlations are much lower in intensity and thus are easily distinguished from the autocorrelation signal. The optical correlator system 100 has a previously prepared multiple matched filter memory with a particular image or set of images, and produces an autocorrelation only when the scene image duplicates or is close in character to that which produced the multiple matched filter 600. For any other image/filter combination a reduced correlation signal results. This reduced correlation signal's strength is a measure of the degree of match between the scene image and the particular matched filter and is called a cross-correlation signal. The correlation signals output from the inverse Fourier transform lens 700 are output to a correlation plane detector 800. The correlation plane detector 800 is any type of photo detector device for displaying the correlation signal. The output of the detector 800 can be input to a processing circuit that conditions the signal for various further functions if necessary or required.

Figure 2:
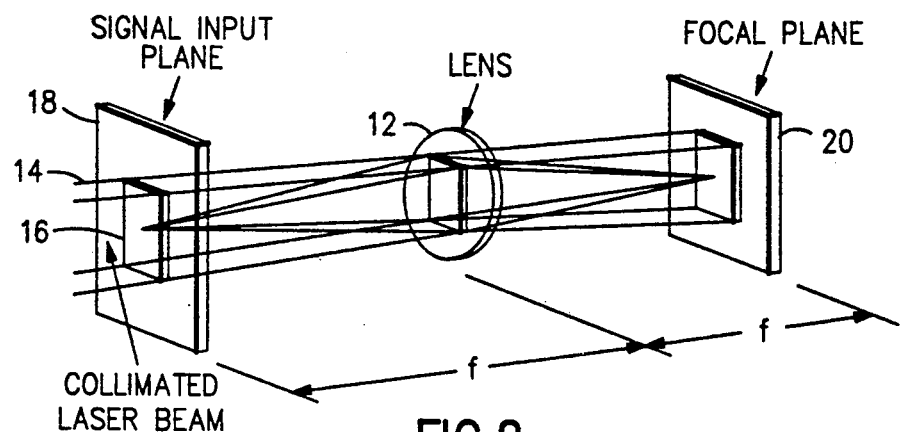
FIG. 2 illustrates a schematic representation of an optical Fourier/inverse Fourier transform system configuration.

The above description of the optical target recognizer system is a general overview; therefore, to fully appreciate subsequent discussions, it is necessary to develop an understanding of the principles involved in the various stages of operation of the optical target recognizer system discussed above. To achieve an understanding of the overall optical correlation process and the operation of the optical target recognizer, a brief discussion of an optical Fourier/inverse Fourier process is given as well as a discussion on the development and use of holographic lenses and matched filters utilizing basic optical principles and the Fourier transform. FIG. 2 illustrates an optical Fourier transform lens 12 illuminated by a collimated beam of laser light 14. The only requirement for the lens 12 is that It be a converging lens of "good" quality. The higher the quality of the lens, the less distortion of the transmitted light. Depending on the direction of the light beam, two focal planes, front and back, can be defined. The light wave amplitudes in the front and back focal planes bear a particular unique relationship to one another, known as the Fourier transform. The optical Fourier transform is in actuality a good approximation of the true mathematical Fourier transform. Given a collimated beam of light directed into space, the light beam will eventually diffract into a specific diffraction pattern. This diffraction pattern is the optical Fourier transform because it resembles the true Fourier transform. By utilizing a converging lens 12, the diffraction pattern is moved in from what is commonly referred to as far field to the near field. Therefore, the lens 12 is only needed to create a near field optical Fourier transform as opposed to a far field optical Fourier transform. The general form of the two dimensional optical Fourier transform can be written as $$F(u,v) = \int \int A(x_1, y_1) e^{-j2\pi(ux_1 + vy_1)} dx_1 dy_1, \quad (1)$$

where u and v are the spatial frequencies, and $x_1$ and $y_1$ are the coordinates for the object 16 at the signal input plane 18 described by the function $A(x_1,y_1)$ Equation (1) represents the optical Fourier transform/inverse Fourier transform operation used to obtain a mathematical inverse transform by taking a Fourier transform of a Fourier transform which yields a negative or inverted image of the inverse transform with some constant factor. In other words, in order to obtain an inverse Fourier transform, all that is required is that the Fourier transform be Fourier transformed a second time. However, the second Fourier transform results in an inverted representation of the original image.

A signal, which is a signal or target modulation that is present on a carrier light beam, of either one or two-dimensional nature appropriately displayed in the front focal plane $A(x_1,y_1)$ of the lens 12 has its power density spectrum $|F(u,v)|^2$ spatially dispersed in the back focal plane 20 of the lens 12. The coherent light beam 14 picks up the amplitude and phase modulation which represents the signal, and through diffraction and interference produces a far field pattern at the back focal plane 20. The pattern can be seen by capturing the light on a screen, or used by recording it on a piece of film. If the diffraction pattern is recorded on film it appears as the spectral power density of the signal and phase is lost. This spectral power filter or Weiner filter is useful for pattern matching but does not possess the means to provide phase and amplitude discrimination.

Figure 3:
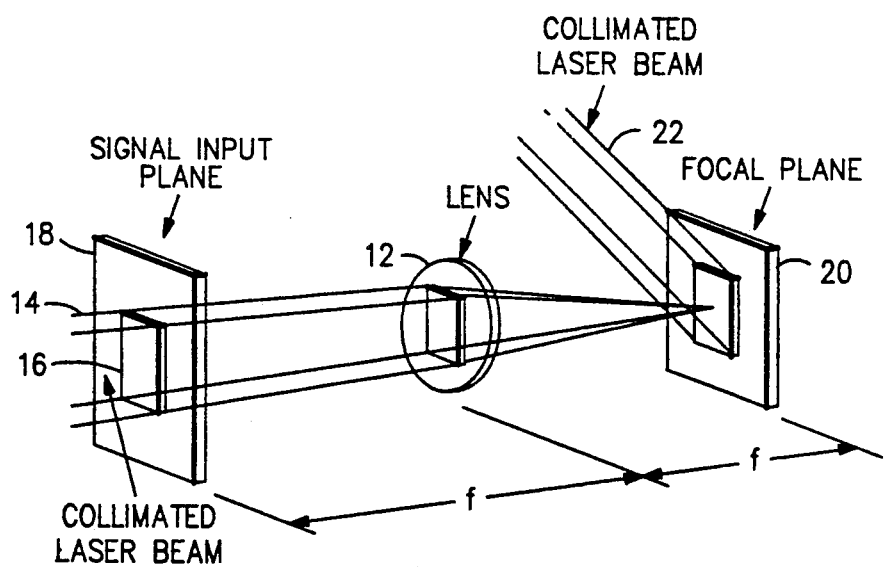
FIG. 3 illustrates a schematic representation of a system for recording matched filters.

FIG. 3 is similar to the arrangement of FIG. 2 with one exception. In FIG. 3, the collimated light beam 14, provided by a laser, is split into two beams, one of which traverses the signal input plane 18 as before, while the bypass or reference collimated beam 22 is made to interfere with the signal beam 14 at the back focal plane 20. If no signal is present at the input aperture 18, the interference of the two beams 14 and 22 produces a structure of fine, straight lines which is an unmodulated spatial carrier that can be resolved only with a microscope. The presence of a signal in the aperture 18, however, produces modulation on the spatial carrier manifested by a complex contouring in the pattern, as well as a modulation in the local light intensity. This pattern can be recorded on film, such as silver halide and photopolymer, to store the total information present in the signal input, which is relative phase information as well as intensity information. The recording is called a complex Fourier transform hologram, or matched filter after Vander Lugt.

Figure 4:
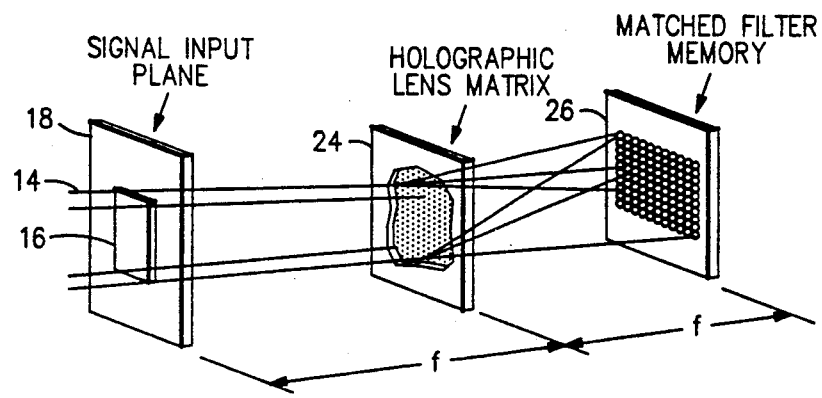
FIG. 4 illustrates a schematic representation of a system for the interrogation of matched filters.

The configuration shown in FIG. 4 depicts a single channel system providing parallel interrogation of a large matched filter memory. The matched filter memory is created by the techniques discussed above. The transform lens 12 of FIGS. 2 and 3 has been replaced by a holographic lens matrix 24. Each elemental hologram performs as a lens to converge the collimated light beam 14 to a specifically designed focal point and Fourier transforms the signal or target modulation that is present on the light beam 14. The focal positions of each lens in the multiple holographic lens matrix 24 is, by design, offset incrementally in the x and y directions from its neighboring element, and unlike a conventional lens, can be directed off axis. Since each elemental lens views the entire input aperture 18, each holographic lens forms an independent replication of the entire input object 16. For example, if a sixteen element lens matrix in a 4×4 format is utilized, sixteen diffraction patterns or Fourier transforms of the same input appears simultaneously at the back focal plane, which in FIG. 4 is a matched filter 26 which as stated previously is created by utilizing the process described above.

Figure 5:
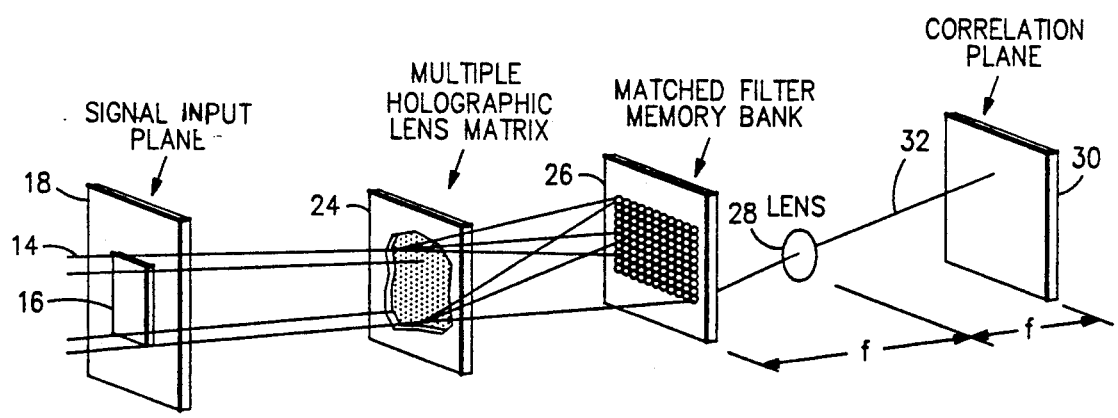
FIG. 5 illustrates a schematic representation of a basic optical processor.

FIG. 5 illustrates the overall optical processing configuration. A lens 28 is placed behind the matched filter memory 26 to inverse Fourier transform all light passing through the matched filter 26 memory. In the back focal plane of this lens 28, the transmitted light is photodetected by the correlation plane detector 30, thereby producing an electrical data stream. The cross-correlated scattered light coming from the unmatched input forms a low level diffuse output, cross-correlation, at the output correlation plane 30. The narrow collimated beam 32 is generated for autocorrelation when a match occurs at the input 18, and is brought to focus by the lens 28 at the correlation plane 30 to form the autocorrelation peak.

Figure 6:
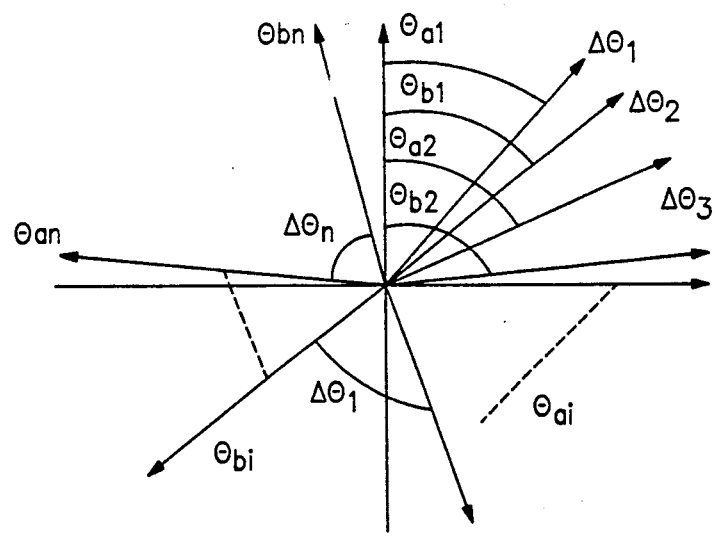
FIG. 6 provides a graphic illustration of the general arrangement for matched filter orientations utilized by the multiple correlation system of the present invention.

The multiple target correlator of the present invention makes it possible to store a number of different parts or objects on one matched filter plate and interrogate it with a multiple image scene to detect, identify, create and establish the orientation of each scene object that is contained in the matched filter element. The multiple target correlator system enhances the optical target recognizer described above by storing multiple targets at different angles on the single matched filter plate. Referring to FIG. 6, there is shown a general layout for various matched filter recording angles. Two matched filters are provided for each object or target, so that when the input object scene is rotated through some angle $\theta_s$ causing a correlation to occur for $\theta_{ai}$ and $\theta_{bi}$, which correspond to matched filter orientations, the correlations will appear consecutively at these two different angles, one for each object. Since the angular difference is unique for this particular object, the $\Delta\theta$ will then serve as identification tag for that particular object. In more specific terms, $\theta_{ai}$ corresponds to the angular position of a first matched filter for object #1, $\theta_{bi}$ corresponds to the angular position of a second matched filter for object #1, and $\Delta\theta$, is the angular difference between the first and second matched filters. This difference is represented by $$\Delta\theta_1 = \theta_{a1} - \theta_{b1}, \quad (2)$$

or more generally as $$\Delta\theta_i = \theta_{ai} - \theta_{bi}, \quad (3)$$

As is described above, a correlation spot is detected when the scene image duplicates or is close in character to that which produced the multiple matched filter. Therefore, for each particular object or target, there should be two correlation spots, one at angle $\theta_{ai}$ and one at angle $\theta_{bi}$. As other parts or objects appear their $\Delta\theta$ is noted in the same manner and an identification tag assigned. The camera angle $\theta_s$ at which the object correlates is recorded at that time and is used with the known matched filter angle $\theta_{ai}$ and $\theta_{bi}$ to obtain the objects' orientation. From these operations then, it is possible to obtain unambiguous detection, location and orientation of the object using selected dual-angle multiple matched filters with a rotating multiple object input image scene. A complete description of the overall process is described in detail in subsequent paragraphs.

The key to eliminating the ambiguity involved in the identification process is the use of recording identical matched filters at two angular positions resulting in a difference angle that is unique for the particular object. To make $\Delta\theta$ a unique value for each object, one could select numbers by trial and error or formulate some relationships that will satisfy the following requirements:

(1) No two matched filters shall share the same angular position.

(2) The angular difference between any two matched filters shall not be the same as any other matched filter pair.

(3) No angular position of any matched filter may be a multiple of any other matched filter.

(4) In satisfying conditions (1) through (3), the angle differences must be large enough to permit practical system operation.

In the preferred embodiment, a geometric progression given by $$a + ar + ar^2 + ar^3 + \ldots ar^{N-1}, \quad (4)$$

is utilized to generate the unique angles for each matched filter pair. Equation (4) represents only one of many possible formulas that can be utilized to generate unique angle combinations.

Figure 7B:
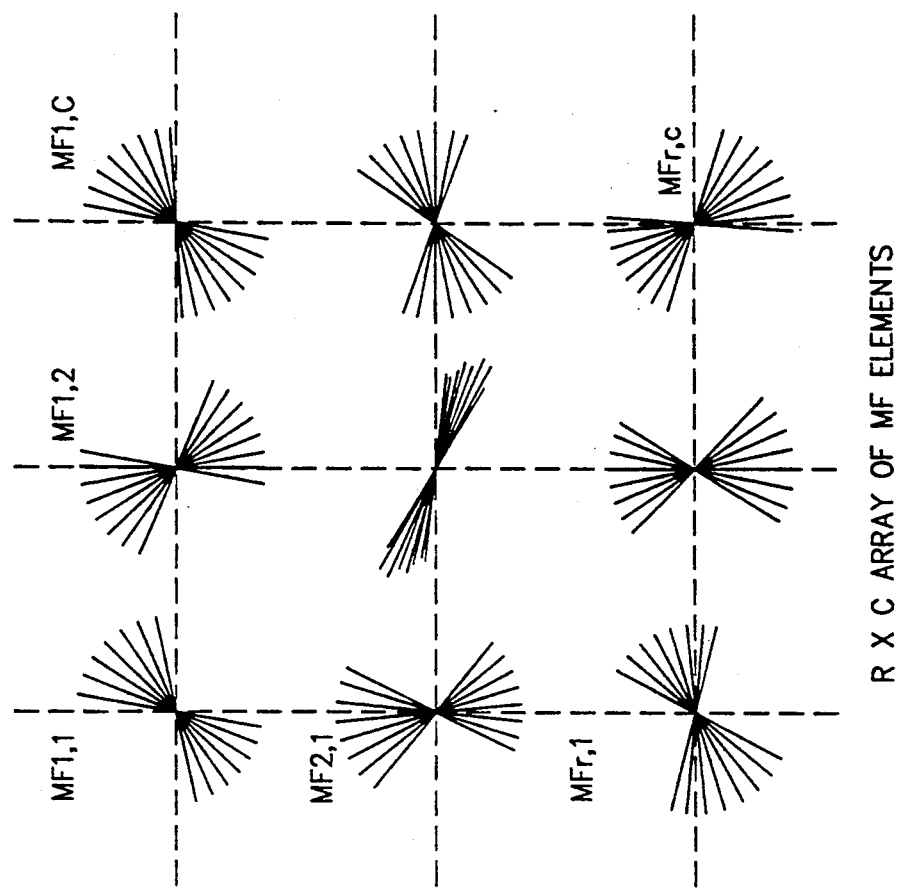
FIG. 7b shows a graphic illustration of an R×C array of matched filter elements utilized by the multiple target correlator system of the present invention.
Figure 7A:
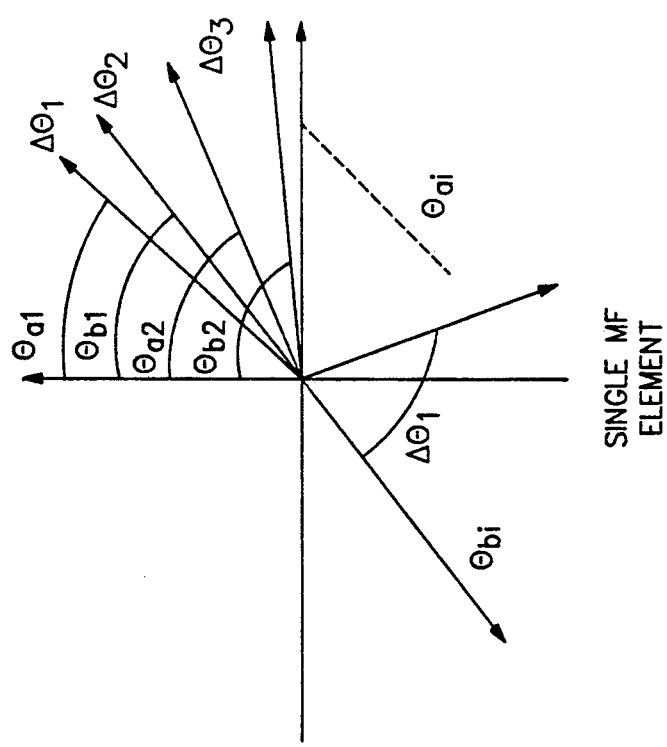
FIG. 7a is a graphic illustration of a single matched filter element utilized by the multiple target correlation system of the present invention.

FIG. 7a illustrates the arrangement for a single multiple target matched filter element and FIG. 7b illustrates how an array of such filter elements may be arranged. As indicated above, the filter angles are each unique such that $$\Delta\theta_1 \neq \Delta\theta_2 \neq \ldots \Delta\theta_i \neq \ldots \Delta\theta_n. \quad (5)$$

There can be 2n filters stored in each filter element and from FIG. 7b, it is seen that the number of filters that can be stored in the R×C array of filter elements is given by $$\text{Total Number of Filters} = R \times C \times 2n, \qquad (6)$$

and thus the total number of objects stored is given by $$\text{Total Number of Objects} = R \times C \times n, \qquad (7)$$

since two filters are required for each object.

As was previously stated, a 3×3 multiple matched filter array having pairs of matched filters recorded at eight unique orientations is utilized in the preferred embodiment. Therefore, using these numbers in equations (6) and (7) results in seventy-two matched filters able to detect thirty-six unique objects or targets.

Table 1 shown below, contains the unique angles for recording each matched filter as well as the identification difference angle for each of a possible eight objects. Table 1 is generated by utilizing equation (4) with a equal to 10.0, r equal to 1.25 and N equal to 16.

TABLE 1

| Object | MF-b | MF-a | Diff. Angle |
|---|---|---|---|
| 1 | 15.6° | 12.5° | 3.1° |
| 2 | 24.4° | 19.5° | 4.9° |
| 3 | 38.1° | 30.5° | 7.6° |
| 4 | 59.6° | 47.77° | 11.9° |
| 5 | 93.1° | 75.5° | 18.6° |
| 6 | 145.5° | 116.4° | 29.1° |
| 7 | 227.4° | 181.9° | 45.5° |
| 8 | 355.5° | 284.2° | 71° |

Using Table 1 for example, object #1's matched filters would be recorded at angular positions of 12.5 degrees and 15.6 degrees respectively, with a resulting difference angle of 3.1 degrees that is unique to object #1 and thus serve as an identification tag for object #1. Utilizing the values in Table 1 would allow for the recording of sixteen matched filters on one single element of the multiple matched filter and thus there would be a total of eight objects on that particular matched filter element. Other values and/or progressions might be selected to obtain more filters or change the angular distribution of these filters. Table 1 illustrates that based on the use of equation (4) with the present values of a, r and N, a maximum of eight objects can be recorded. In a preferred embodiment, however, there are a total of four objects on a particular matched filter element. Table 2 given below contains the unique angles for recording each matched filter as well as the difference angle for each of the four objects.

TABLE 2

| Object | MF-b | MF-a | Diff. Angle |
|---|---|---|---|
| 1 | 15.6° | 12.5° | 3.1° |
| 2 | 24.4° | 19.5° | 4.9° |
| 3 | 38.1° | 30.5° | 7.6° |
| 4 | 59.6° | 47.77° | 11.9° |

Figure 8B:
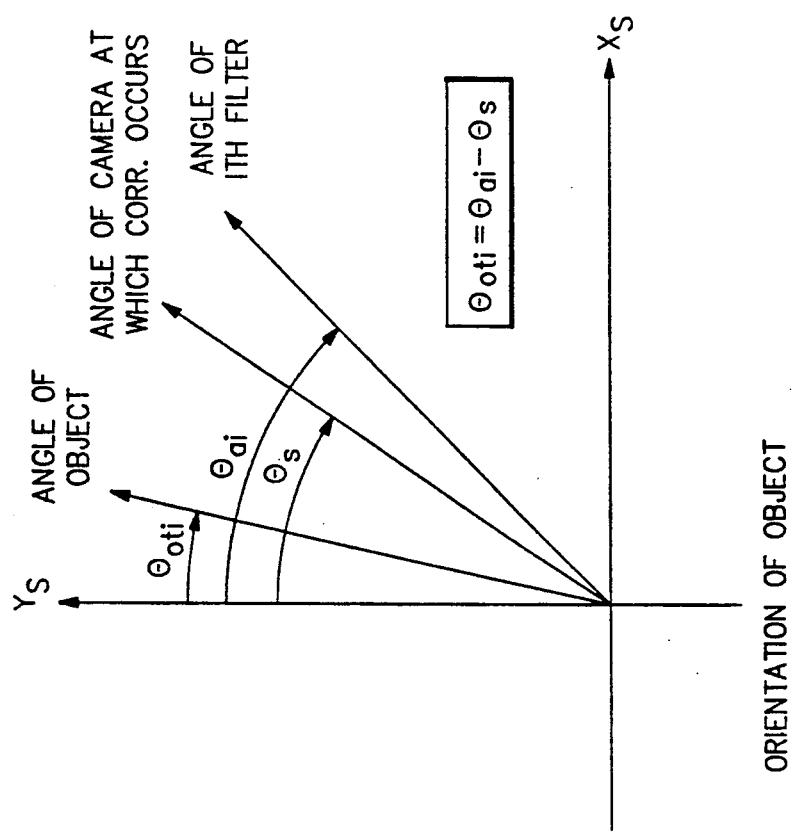
FIG. 8b provides a graphic illustration of the relationship between the orientation of an object and the two coordinate systems in which the object resides.
Figure 8A:
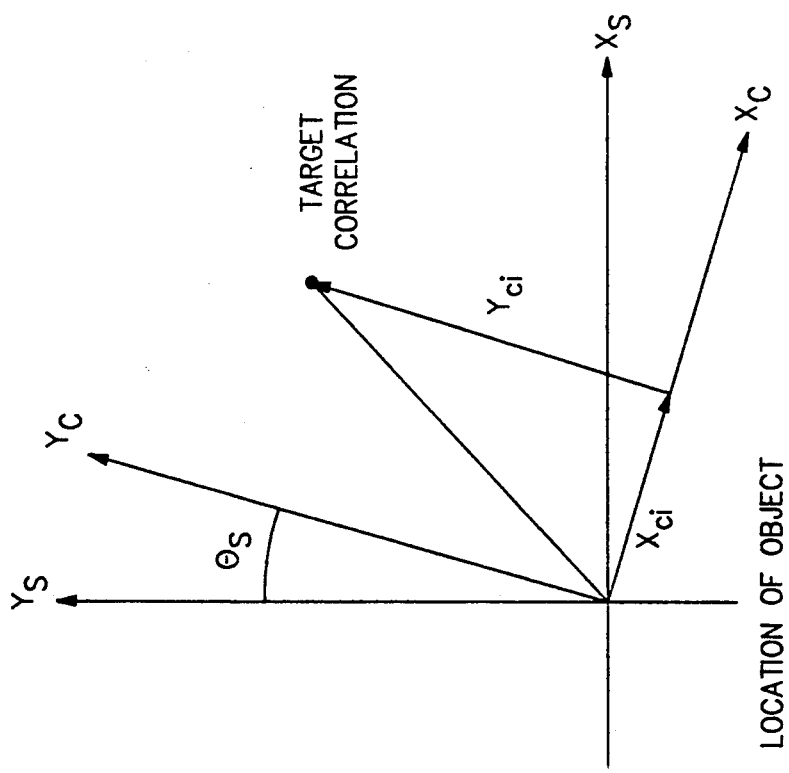
FIG. 8 is a graphic illustration of the relationship between the location of an object and the two coordinate systems in which the object resides.

The coordinates of the matched filters and the correlation plane are related to both the scene and the camera positions. However, the location of the correlation peak in itself does not tell the system user the orientation of the particular object or target. The correlation occurrence, however, tells us to look for a $\Delta\theta_i$ pair. The orientation of the object is then determined from the camera orientation and the matched filter orientation. FIGS. 8a and 8b illustrate the target correlation of the object in scene and camera coordinates and the orientation of the object in scene coordinates respectively.

Referring specifically to FIG. 8a, the object location coordinates for scene and camera are related by the camera rotation angle $\theta_s$ and is described by the matrix equation given by $$\begin{bmatrix} X_s \\ Y_s \end{bmatrix} = \begin{bmatrix} \cos\theta_s & -\sin\theta_s \\ \sin\theta_s & \cos\theta_s \end{bmatrix} \begin{bmatrix} X_c \\ Y_c \end{bmatrix} \qquad (8)$$

$$Z_s = Z_c.$$

Equation (8) is derived directly from FIG. 8a by standard resolution techniques utilizing right triangle trigonometry. The scale factor between coordinate systems is not unity as indicated in equation (8), but rather is a constant which would be factored into the solution for the object location.

The object position in the correlation plane is transformed back to scene coordinates by utilizing the general resolution relationship given in equation (8) and substituting $Y_{ci}$ and $X_{ci}$, which are the true linear distances or coordinates of the object, for $Y_c$ and $X_c$, which are the correlation coordinate axis'. The object or target position in scene coordinates is given by $$\begin{bmatrix} X_{si} \\ Y_{si} \end{bmatrix} = \begin{bmatrix} \cos\theta_{si} & -\sin\theta_{si} \\ \sin\theta_{si} & \cos\theta_{si} \end{bmatrix} \begin{bmatrix} X_{ci} \\ Y_{ci} \end{bmatrix} \qquad (9)$$

$$Z_s = Z_c.$$

Referring now to FIG. 8b, it is seen that the angle or the orientation of the object, $\theta_{oti}$, can be derived from the difference between the angle of the ith filter, $\theta_{ai}$, and the angle of the camera at which correlation occurs, $\theta_s$. This relationship is given by $$\theta_{oti} = \theta_{ai} - \theta_s. \qquad (10)$$

Figure 9:
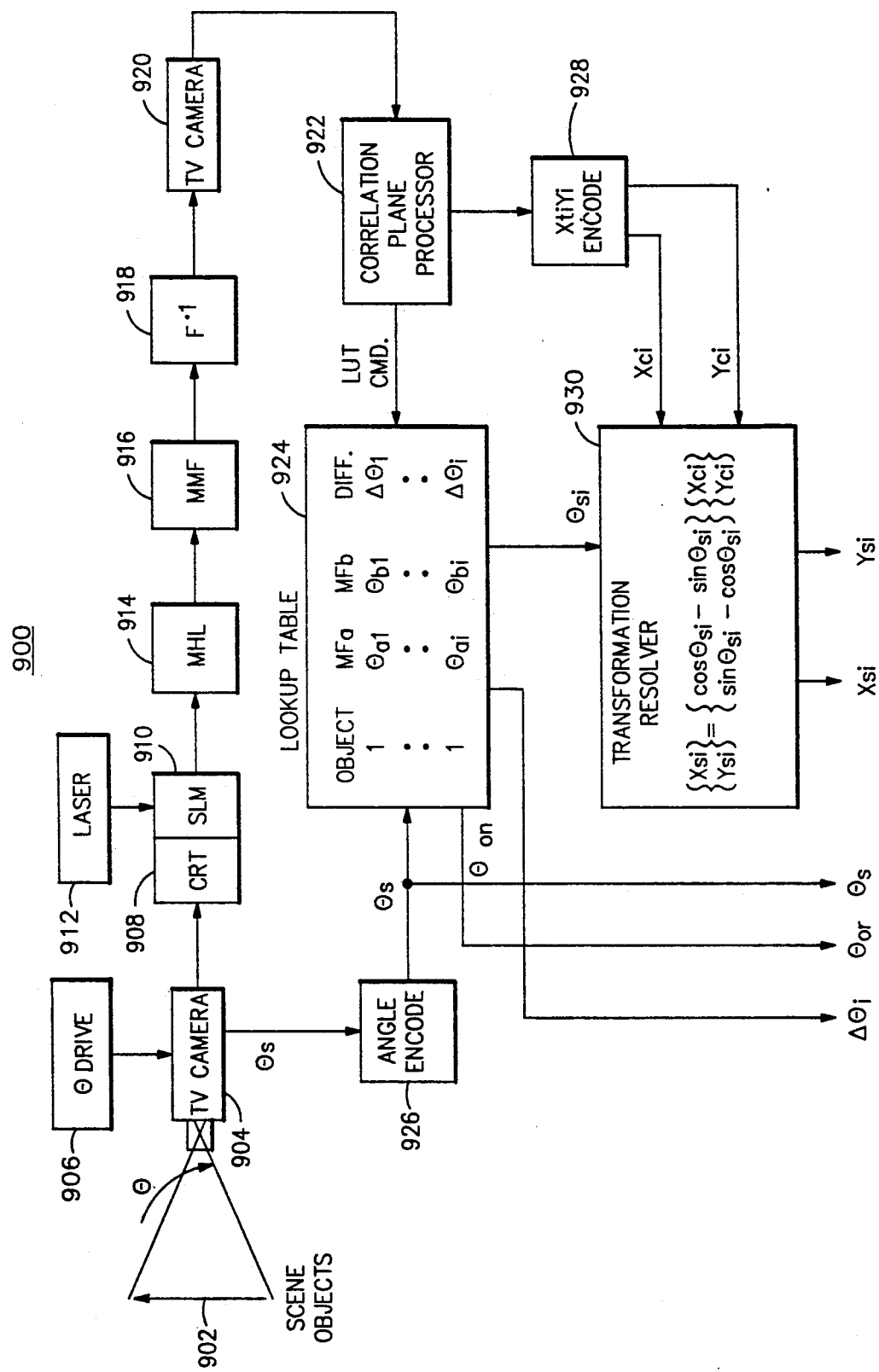
FIG. 9 is a block diagram of the multiple target correlator system of the present invention.

Referring now to FIG. 9, there is shown a detailed diagram of the multiple target correlator system 900. In describing this figure, all the previously described concepts shall be tied together in a cohesive description. The majority of the electronic components illustrated in FIG. 9 could reside in a PC with suitable interface and decoder components; however, to better illustrate the operation of the multiple target correlator system, the components which perform the various functions are arranged as discrete elements with input and outputs signals. The description of the operation of the multiple target correlator system 900 for detecting, identifying and locating the positions and orientations of multiple objects in a scene is as follows.

Multiple scene objects 902, which can be tools or machine parts, are viewed by a video imaging means 904 such as a video camera. The video camera 904 is rotated 360 degrees to obtain the information necessary to unambiguously identify each target and determine its location and orientation. The rotation of the video camera 904, or more precisely, the rotation of the camera imaging plane is accomplished by mechanical rotation of the video camera 904 about its longitudinal axis, by electronic means utilizing a raster sine-cosine resolver or optically by means of a dove prism. In the present embodiment, the rotation of the camera imaging plane is accomplished by mechanical rotation of the video camera 904 via an electromechanical drive circuit 906. Regardless of the means of rotation, the camera imaging plane is rotated about the longitudinal axis of the video camera 904 at a constant velocity of $\theta_s$ rad/sec or deg/sec. Given the precise control of the rotation, the exact angular position of the camera imaging plane can be determined at any time. The importance of noting this angle is crucial to the operation of the system and will be discussed subsequently. In an alternate embodiment, it is possible to have a stationary or fixed camera imaging plane and a rotating scene. As long as the scene is rotated at the known speed, $\theta_s$, the results are exactly the same. The scene captured by the video camera 904 is then input to a cathode ray tube 908.

Figure 10:
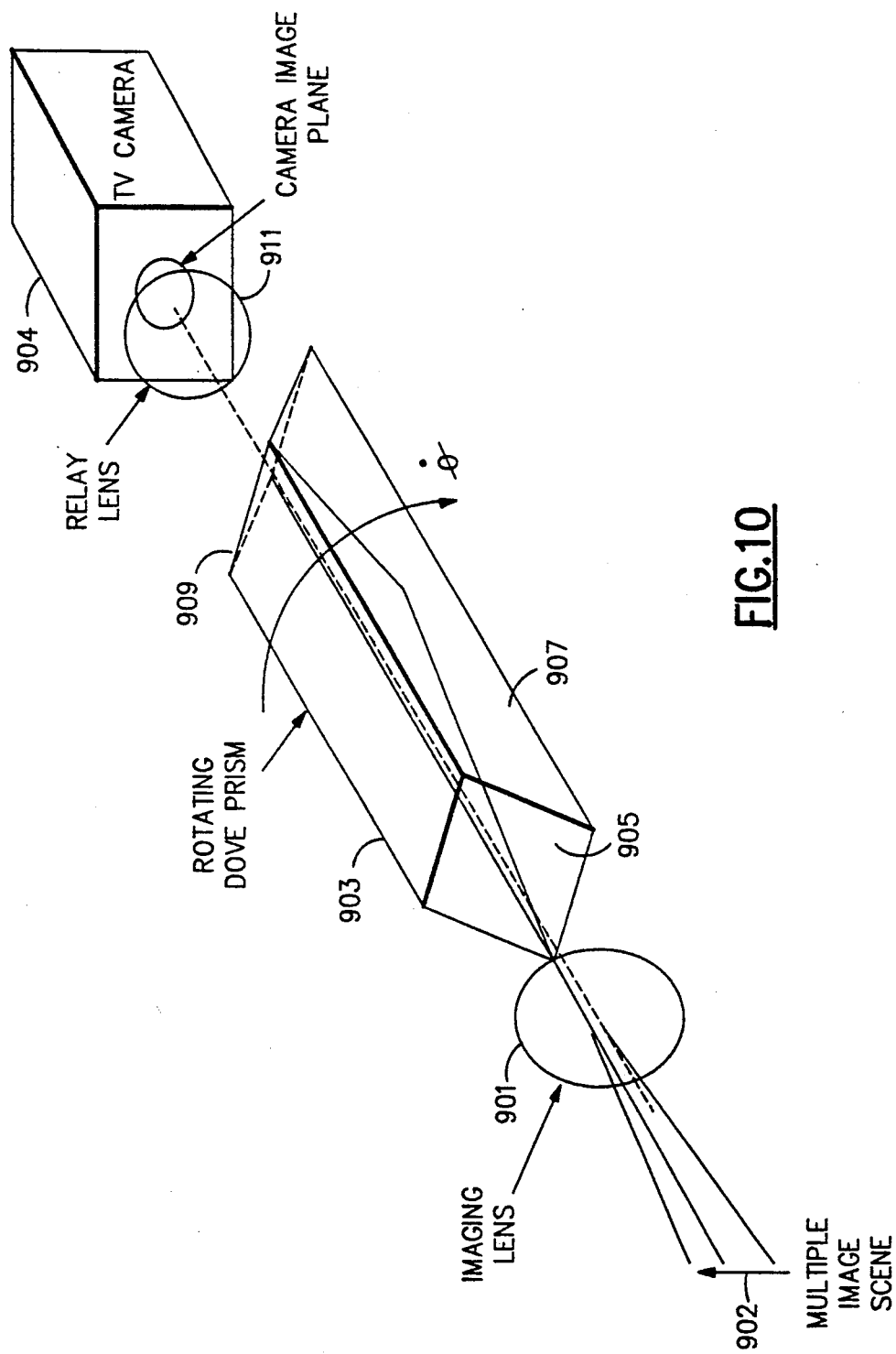
FIG. 10 illustrates a schematic representation of a Dove prism means for rotating the multiple image scene.

Optical rotation of the image plane about its midpoint can be accomplished utilizing a variety of optical rotators or prisms. The essential requirements for the prism are that the axes of the entering and emerging beams must lie in the same straight line and there must be an odd number of reflecting surfaces. The most common prisms used for image rotation are the Dove prism, the Abbe K prism, the Taylor V prism, the Schmidt or Pechan Z prism and the Uppendahl M prism, with the Dove prism being the simplest image rotator. FIG. 10 illustrates the basic Dove prism configuration as it would be used in the present invention. The object or multiple image scene 902 is focused onto the end face of the Dove prism 903 via an imaging lens 901. The light is refracted at the sloping front end face 905 and bent down to the reflecting base 907 where it is then reflected towards the rear end face 909. The slopes or angles of inclination of the front end face 905 and the rear end face 909 can be any value; however, they must be equal. Typically, the angle of the end faces are 45 degrees. In operation, the Dove prism is rotated at the angular velocity $\theta_s$. The image 902 rotates in the same direction as the prism 903 is turned; but at twice the prism 903 velocity. Therefore, when the prism 903 has been rotated 90 degrees, the image 902 is completely inverted. Because of the odd number of reflections, the image 902 is left-handed, and a second lens, which in this embodiment is a relay lens 911, must be utilized to correct the orientations of the image 902 if desired, and to focus the image 902 onto the camera 904.

The cathode ray tube 908 displays the video image from the camera 904 and transfers the image signal to a spatial light modulator 910. The spatial light modulator 910 serves to store an image of the real time input from the cathode ray tube 908 and acts like an optical transparency impressing this image onto a collimated coherent laser beam, supplied by a laser 912, in the form of amplitude and/or phase modulation. The collimated coherent laser beam interacts with the spatial light modulator 910 and is modulated with the electrical signal equivalent of the video scene image from the cathode ray tube 908. The spatial light modulator 910 can be an electrically addressed device such as a Cassio liquid crystal TV or a Sight-Mod by Semitek. In this embodiment, a write with light spatial light modulator is utilized. The image modulated laser beam exiting the spatial light modulator 910 is input or directed to a multiple holographic lens 914.

The multiple holographic lens 914 comprises R rows and C columns, and provides $R \times C$ Fourier transforms of the modulated laser beam exiting the spatial light modulator 910. The $R \times C$ Fourier transforms of the modulated laser beam appears at the multiple matched filter plane 916 where they address or interrogate $R \times C \times 2n$ matched filters 916. The $R \times C \times 2n$ matched filters 916 are oriented as per Table 2 to eliminate false target detection and ambiguities. An inverse Fourier transform lens 918 is placed in the path of the signals exiting the multiple matched filter plane 916 to Fourier transform the Fourier transformed image. In the back focal plane of the inverse Fourier transform lens 916, the transmitted light is photodetected by the correlation plane detector 920, which in this embodiment is a television camera or video camera. The correlation plane detector 920 however, can be any type of suitable photodetector array. The television camera 920 converts the transmitted light into an electrical data stream which is input into a correlation plane processor 922. The correlation plane processor 922 may or may not process the electrical data stream. If further processing is done however, the signal processing means can vary from a simple video threshold circuit to an elaborate digital processor. Irrespective of the type of processor utilized, if any is utilized, the output of the correlation plane processor 922 must be suitably conditioned for input to a look-up table 924 and an XY encoder circuit 928.

The correlation plane processor 922 outputs a LUT command signal to the look-up table 924 when a correlation signal is detected at the correlation plane 920. The correlation signal indicates that the image which appears at the scene 902 matches the matched filter recording currently being interrogated. This correlation signal is the autocorrelation peak discussed previously. The LUT command instructs the look-up table 924 that at that particular instant a correlation is occurring. Upon receipt of the LUT command, the look-up table 924 is initialized and the angle of the video camera $\theta_s$ is input to the look-up table 924 via an angle encoder 926 and the angle $\theta_s$ is noted or saved. When the next correlation occurs, a second LUT command signal is sent to the look-up table 924 and the corresponding angle $\theta_s$ is also noted. Once two correlations occur, the difference between the two corresponding angles is taken and compared to the difference angles stored in the look-up table 924. If the difference in the two noted $\theta_s$'s correspond to the particular difference angle $\Delta\theta_i$, then the particular object is identified, if not, the look-up table 924 will generate a false alarm description which indicates to the system and the system user to continue to scan for objects until a correct identification is made. Once a correct identification is made, then $\theta_{ai}$ and $\theta_{bi}$, which correspond to the particular $\Delta\theta_i$, are noted for further calculations as described subsequently.

To provide an additional cross-check on the overall process, a determination is made to see if the autocorrelation peak occurs at the same location in the correlation plane for both $\theta_{ai}$ and $\theta_{oi}$. Upon receipt of the $\Delta\theta_i$, which is the identification of the part or object, the additional cross-check can be made by transforming the corresponding $\theta_{ai}$ and $\theta_{bi}$ values to determine if a single correlation location results. Should this procedure produce two separate correlation locations, then the entire process should be repeated as indicated above.

The look-up table 924 is implemented utilizing a microprocessor and associated memory. The information listed in Table 2 is stored in the microprocessor memory for each of the $R \times C$ matched filters. The angle encode circuit 926 converts the angular position $\theta_s$ of the video camera 904 into a format suitable for entry into the look-up table 924. The look-up table 924 utilizes $\theta_s$ from the angle encode circuit 926 to determine $\theta_{ai}$, $\theta_{bi}$ and $\Delta\theta_i$ as stated above. Additionally, the look-up table 924 utilizes $\theta_s$ to determine the object orientation, $\theta_{oti}$, from $\theta_{ai}$ and $\theta_s$ utilizing the relationship expressed in equation (10). Thus, the look-up table 924 directly outputs the identification tag of the object or target, $\Delta\theta_i$, the objects orientation, $\theta_{oti}$, and the angle of the video camera 904 $\theta_s$. In addition, the look-up table 924 outputs the angle $\theta_{si}$, which corresponds to the angle between the object or target and the scene coordinate axis, to a transformation resolver 930.

The transformation resolver 930, like the look-up table 924 is implemented utilizing a microprocessor and associated memory. The transformation resolver 930 implements the relationship expressed in equation (9). The angle $\theta_{si}$ is received from the look-up table 924 and $X_{ci}$ and $Y_{ci}$ are received from the XY encoder circuit 928. The XY encoder 928 receives the linear coordinates of the object from the correlation plane processor 922 and encodes them in a format suitable for use by the transformation resolver 930. The XY encoder 928 encodes the incoming data by means of vertical and horizontal TV counters and suitable logic. Based upon equation (9), the transformation resolver 930 calculates $X_{si}$ and $Y_{si}$, which are the coordinates of the object or target in scene coordinates. Therefore, utilizing the multiple target correlator system, a person can unambiguously detect a particular object by its identification tag $\Delta\theta_i$, determine the objects' orientation, $\theta_{oti}$, and its coordinates $X_{si}$ and $Y_{si}$.

Figure 11:
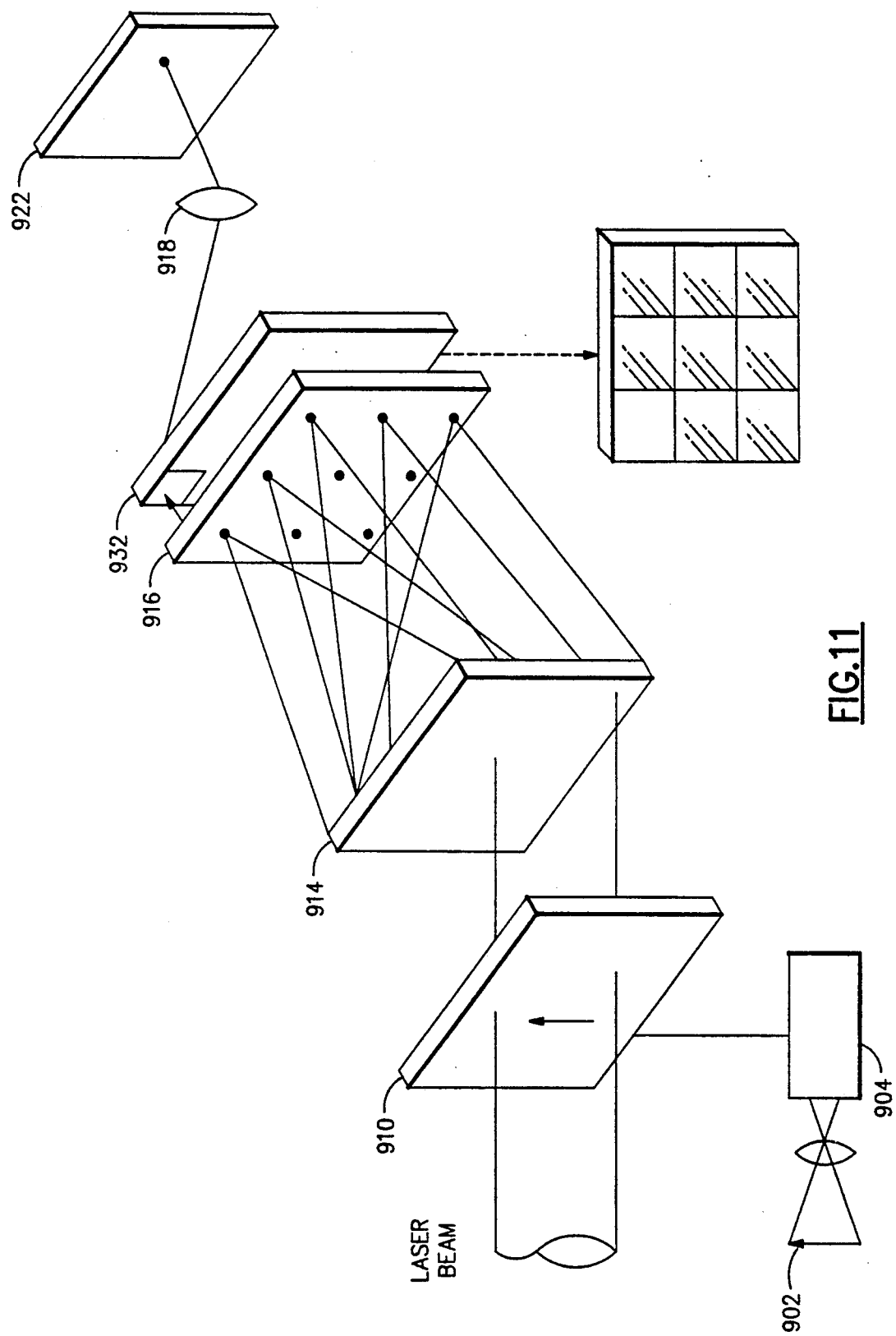
FIG. 11 illustrates a schematic representation of an arrangement for the optical switching of matched filters in a multiple matched filter array.

As a further extension of the concept employed by the present invention, it is possible to store $R \times C \times n$ objects which can be accessed in mass or one matched filter element at a time. In a similar fashion, the $R \times C$ elements each can contain a set of range or scale factors where each element would be addressed according to the range-scale desired. An optical shutter array comprised of liquid crystal, magneto-optic or other suitable optical switching materials is placed at the rear of, and, close to the multiple matched filter. The placement of the optical shutter array is after the multiple matched filter to eliminate phase distortion. By means of electronic controls, selective interrogation of one or more matched filter combinations can be obtained. FIG. 11 illustrates the above concept. As shown in FIG. 11, the optical shutter array 932 is placed immediately behind or in the back focal plane of the multiple matched filter 916 which is being addressed or interrogated by the signals exiting the multiple holographic lens 914. As can be seen in the figure, only one element of the optical shutter array 932 is transmissive while the remaining elements are opaque. The autocorrelation signal is shown exiting the one transmissive element and is input to the inverse Fourier transform lens 918 and directed to the correlation plane detector 922. The optical shutter array 932 provides the means for addressing any one or combinations of matched filters shown in FIG. 7b. This offers the advantage of rapid switching of scales, targets, and architectures in the matched filter plane making the multiple target correlator system more versatile and responsive for varying image requirements.

While the invention has been particularly shown and described with respect to preferred embodiments thereof, it will be understood by those skilled in the art that the foregoing and other changes in form and details may be made therein without departing from the spirit and scope of the invention, which should be limited only by the scope of the appended claims.

What is claimed is:

1. A multiple target correlator system comprising:
   (a) an imaging means for providing an image of an object or scene of interest;
   (b) means for modulating a coherent beam with said image to form an image modulated beam;
   (c) means for optically Fourier transforming said image modulated beam into a spatial frequency distribution of said image;
   (d) multiple matched filter means disposed in the back focal plane of said means for optically Fourier transforming, and comprising at least one matched filter element having at least two matched filters recorded thereon for said object of interest and wherein said at least two matched filters are recorded at a predetermined unique angular difference, said spatial frequency distribution of said image multiplically interacts with said at least two matched filters resulting in first and second product signals;
   (e) means for optically inverse Fourier transforming said first and second product signals to produce a pair of optical correlation signals;
   (f) a correlation plane detector means, disposed in the back focal plane of said means for optically inverse Fourier transforming, for detecting said pair of optical correlation signals and producing electric output signals representative of said pair of correlation signals; and
   (g) means for processing said electric output signals comprising:
   storage means having said predetermined unique angular difference of said at least two matched filters stored therein;
   means for receiving said electric outputs signals from said correlation plane detector; and means for calculating the orientation of said particular object of interest and providing said particular object of interest with an identification tag.

2. The multiple target correlator system of claim 1 further comprising resolving means for calculating the position of said particular object of interest in user defined coordinates, said resolving means having means for receiving the position of said particular object of interest, in camera coordinates, from said correlation plane detector and the angular difference between said particular object and the coordinate axis of the particular scene of said particular object of interest from said storage means.

3. The multiple target correlator system of claim 2, wherein said multiple matched filter means comprises a plurality of matched filter pairs having a first and second matched filter, each filter pair recorded at a predetermined unique angular difference, each of said matched filter pairs being recorded for and corresponding to one of a plurality of objects of interest.

4. The multiple target correlator system of claim 2, wherein said imaging means comprises:
   video camera means for capturing said image of said particular object of interest; and
   control means connected to said video camera means, said control means being operable to drive said video camera means at a predetermined rate through a 360 degree rotation.

5. The multiple target correlator system of claim 4, wherein said means for modulating comprises a spatial light modulator, said spatial light modulator receiving said image of said particular object of interest from said video camera means.

6. The multiple target correlator system of claim 1, wherein said means for optically Fourier transforming comprises a multiple holographic lens.

7. The multiple target correlator system of claim 3, wherein each of said first and second matched filters are recorded at a predetermined unique angular difference therebetween to provide said identification tag for each of said objects of interest.

8. The multiple target correlator system of claim 1, wherein said means for optically inverse Fourier transforming includes a multiple holographic lens.

9. The multiple target correlator system of claim 3, wherein said system further comprises:
   a correlation plane processor, receiving the electric output signals from said correlation plane detector, for converting said correlation signals into two dimensional linear coordinates in the camera plane; and
   encoder means for converting said two dimensional linear coordinates into a form suitable for computer processing.

10. The multiple target correlator system of claim 7, wherein said means for processing comprises a processor and associated memory, said memory having said predetermined unique angular difference of each of said first and second matched filters and the angular difference between said first and second matched filters stored therein, said processor comprising said means for comparison and said resolving means.

11. The multiple target correlator system of claim 10, wherein said means for comparison includes a first software routine which calculates the orientation of said object as the difference between the angular position of said first matched filter and the position of said video camera means.

12. The multiple target correlator system of claim 11, wherein said resolving means comprises a second software routine which calculates the position of said particular object of interest in user defined coordinates based upon a trigonometric transformation from scene coordinates.

13. A method for unambiguously identifying an object and determining its location and orientation, said method comprising the steps of:
   (a) scanning a scene for a particular object of interest;
   (b) providing an image of said particular object of interest;
   (c) modulating a coherent beam with said image to form an image modulated beam;
   (d) optically Fourier transforming said image modulated beam into a spatial frequency distribution of said image;
   (e) interrogating a multiple matched filter, having at least one matched filter element with at least two matched filters recorded thereon, such that said spatial frequency distribution of said image multiplically interacts with said at least two matched filters resulting in first and second product signals when there is a match between said at least two matched filters and said spatial frequency distribution;
   (f) optically inverse Fourier transforming said first and second product signals to produce a pair of optical correlation signals;
   (g) calculating the orientation of said particular object of interest based upon the detection of said pair of correlation signals;
   (h) calculating the position of said particular object of interest based upon the detection of said pair of correlation signals; and
   (i) calculating and assigning an identification tag to said particular object of interest based upon the detection of said pair of correlation signals.

14. The method according to claim 13, wherein said step of scanning comprises rotating an imaging means at a predetermined rate through a 360 degree rotation about the image plane axis.

15. The method according to claim 14, wherein said step of modulating comprises impressing the amplitude and phase information stored in said image of said particular object of interest onto said coherent beam.

16. The method according to claim 15, wherein said step of optically Fourier transforming comprises passing said image modulated beam through a multiple holographic lens.

17. The method according to claim 16, wherein said step of interrogating comprises directing said spatial frequency distribution of said image at said multiple matched filter.

18. The method according to claim 17, wherein said step of optically inverse Fourier transforming comprises passing said first and second product signals through an inverse Fourier transform lens.

19. The method according to claim 18, wherein said step of calculating the orientation of said particular object of interest comprises the steps of:
   (a) determining the angular position of a first matched filter upon detection of said pair of correlation signals;
   (b) determining the angular position of the imaging means upon detection of said pair of correlation signals; and
   (c) subtracting the angular position of the imaging means from the angular position of said first matched filter.

20. The method according to claim 18, wherein said step of calculating and assigning an identification tag to said particular object of interest comprises the steps of:
   (a) determining the angular position of a first matched filter upon detection of said pair of correlation signals;
   (b) determining the angular position of a second matched filter upon detection of said pair of correlation signals; and
   (c) subtracting the angular position of the second matched filter from the angular position of the first matched filter.

21. The method according to claim 18, wherein said step of calculating the position of said particular object of interest comprises resolving the linear coordinates of said particular object of interest from image plane coordinates to scene coordinates.

22. A multiple target correlator system comprising:
   (a) an imaging means for providing an image of an object or some of interest;
   (b) means for modulating a coherent beam with said image to form an image modulated beam;
   (c) means for optically Fourier transforming said image modulated beam into a spatial frequency distribution of said image;
   (d) multiple matched filter means disposed in the back focal plane of said means for optically Fourier transforming, and comprising a plurality of matched filter elements having a plurality of matched filters recorded thereon for said object of interest and wherein said plurality of matched filters are recorded at a predetermined unique angular difference, said spatial frequency distribution of said image multiplically interacts with said plurality of matched filters resulting in first and second product signals;

(e) an optical shutter array for addressing a particular matched filter element;

(f) means for optically inverse Fourier transforming said first and second product signals to produce a pair of optical correlation signals;

(g) a correlation plane detector means, disposed in the back focal plane of said means for optically inverse Fourier transforming, for detecting said pair of optical correlation signals and producing electric output signals representative of said pair of correlation signals; and (h) means for processing said electric output signals comprising:

storage means having said predetermined unique angular difference of said plurality of matched filters stored therein;

means for receiving said electric output signals from said correlation plane detector;

means for calculating the orientation of said particular object of interest and providing said particular object of interest with an identification tag; and resolving means for calculating the position of said particular object of interest in user defined coordinates, said resolving means having means for receiving the position of said particular object of interest, in camera coordinates, from said correlation plane detector and the angular difference between said particular object and the coordinate axis of the particular scene of said particular object of interest from said storage means.

23. The multiple target correlator system of claim 22, wherein said imaging means comprises:

video camera means for capturing said image of said particular object of interest; and control means connected to said video camera means, said control means being operable to drive said video camera means at a predetermined rate through a 360 degree rotation.

24. The multiple target correlator system of claim 23, wherein said means for modulating comprises a spatial light modulator, said spatial light modulator receiving said image of said particular object of interest from said video camera means.

25. The multiple target correlator system of claim 22, wherein said means for optically Fourier transforming comprises a multiple holographic lens.

26. The multiple target correlator system of claim 23, wherein said multiple matched filter means comprises a plurality of matched filter pairs having a first and second matched filter, each recorded at a predetermined unique angular difference, each of said matched filter pairs being recorded for and corresponding to one of a plurality of objects of interest, the angular difference between said first and second matched filters provides said identification tag for said object.

27. The multiple target correlator system of claim 22, wherein said optical shutter array comprises an optical switching material which is programmed to only transmit light corresponding to specific matched filter elements thereby achieving selective interrogation of one or more matched filter combinations.

28. The multiple target correlator system of claim 22, wherein said means for optically inverse Fourier transforming is a multiple holographic lens.

29. The multiple target correlator system of claim 23, wherein said system further comprises:

a correlation plane processor receiving the electric output signals from said correlation plane detector for converting said correlation signals into two dimensional linear coordinates in the camera plane; and encoder means for converting said two dimensional linear coordinates into a form suitable for computer processing.

30. The multiple target correlator system of claim 27, wherein said means for processing comprises a processor and associated memory, said memory having said predetermined unique angular difference of each of said first and second matched filters and the angular difference between said first and second matched filters stored therein, said processor comprising said means for comparison and said resolving means.

31. The multiple target correlator system of claim 30, wherein said means for comparison includes a first software routine which calculates the orientation of said object as the difference between the angular position of said first matched filter and the position of said video camera means.

32. The multiple target correlator system of claim 31, wherein said resolving means comprises a second software routine which calculates the position of said particular object of interest in user defined coordinates based upon a trigonometric transformation from scene coordinates.

* * * * *